United States Patent [19]

Kudo et al.

[11] 4,381,682

[45] May 3, 1983

[54] REVERSE-DRIVE BLOCKING LATCH FOR AN AUTOMOTIVE TRANSMISSION

[75] Inventors: Satoru Kudo, Fuchu; Kiyokazu Ohkubo, Wako; Hiroshi Nakayama, Kamifukuoka, all of Japan

[73] Assignee: Honda Giken Kogyo Kabushiki Kaisha, Tokyo, Japan

[21] Appl. No.: 220,146

[22] Filed: Dec. 23, 1980

[30] Foreign Application Priority Data

Dec. 29, 1979 [JP] Japan ................................ 54-172932

[51] Int. Cl.³ .......................... G05G 5/02; G05G 9/18; F16H 57/06
[52] U.S. Cl. .................................... 74/476; 74/473 R
[58] Field of Search .............................. 74/476, 473 R

[56] References Cited

U.S. PATENT DOCUMENTS

| | | | |
|---|---|---|---|
| 1,250,355 | 12/1917 | Robinson et al. | 74/476 |
| 3,418,866 | 12/1968 | Hetmann et al. | 74/477 |
| 3,866,488 | 2/1975 | Nakata et al. | 74/475 |
| 3,933,057 | 1/1976 | Tsuzuki et al. | 74/476 |
| 3,939,724 | 2/1976 | Takahashi et al. | 74/476 |
| 4,018,099 | 4/1977 | O'Brien et al. | 74/476 X |
| 4,133,219 | 1/1979 | Kelbel et al. | 74/476 |
| 4,275,614 | 6/1981 | Okubo et al. | 74/476 |

Primary Examiner—Allan D. Herrmann
Attorney, Agent, or Firm—Armstrong, Nikaido, Marmelstein & Kubovcik

[57] ABSTRACT

An automatic latch for preventing inadvertent shifting of a manually controlled automotive transmission into reverse drive condition from a forward drive condition, includes a latch member which is moved into an operative blocking position upon the movement of a gear shift lever in one direction to engage a forward drive gear and which is moved out of its blocking position upon return of the gear shift lever to a neutral position, the latch, when in an operative position, blocking movement of the gear shift lever directly from engagement of said forward drive gear to engagement of a reverse drive gear.

13 Claims, 16 Drawing Figures

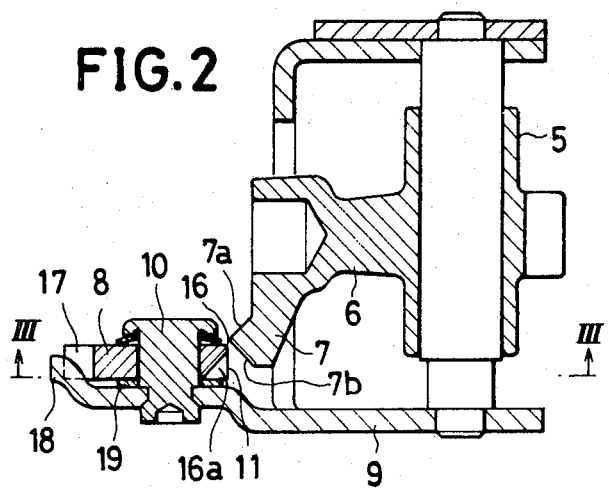
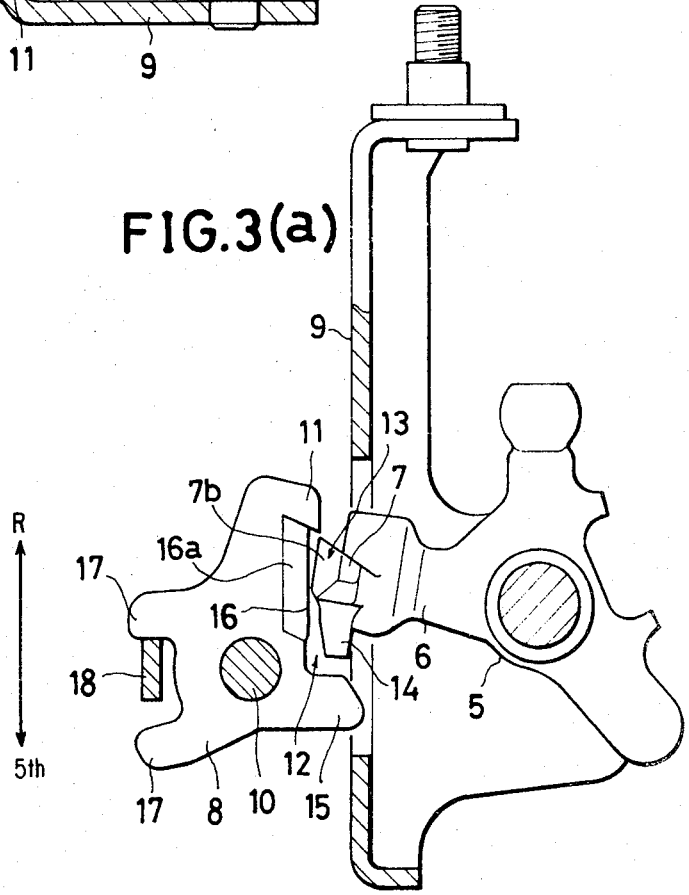

4,381,682

REVERSE-DRIVE BLOCKING LATCH FOR AN AUTOMOTIVE TRANSMISSION

FIELD OF THE INVENTION

This invention relates to an automatic latch for preventing inadvertent shifting of a manually controlled automotive transmission from a forward drive condition directly into a reverse drive condition.

BACKGROUND OF THE INVENTION

A known form of automotive transmission employs a gear shift lever, which, when the transmission is in a neutral position, is movable laterally from a normal central position thereof to gear select positions on each side of the central position, subsequent to which the gear shift lever is moved either forwardly or reversely to engage a selected drive gear of the transmission.

Commonly, the gear shift lever is shifted leftwardly and forwardly to engage the first speed drive gear, is then moved rearwardly to engage the second speed drive gear, is then returned to its central position and is then moved forwardly to engage the third speed drive gear, is then moved rearwardly to engage the fourth speed drive gear, and, is then returned to its central position and is moved laterally to the right and then forwardly to engage the fifth speed drive gear.

Engagement of the reverse drive gear is accomplished by moving the gear shift lever to the right from its central position, and then, instead of shifting the gear shift lever forwardly to engage the fifth speed drive gear, the gear shift lever is moved rearwardly into reverse drive position.

In such a transmission, there is a danger that when moving the gear shift lever from the fifth gear drive position to neutral, the operator may inadvertently move the gear shift lever beyond the neutral position and overshoot into reverse drive position, with consequential clashing of the gears and possible damage thereto.

In order to overcome this problem, it has been prior proposed to incorporate a spring loaded latch into the transmission which prevents movement of the gear shift lever directly from a forward drive position to the reverse drive position. The prior known structure, however, suffers from the disadvantages that it is complex and expensive to manufacture and assemble, and, in the event of breakage of springs employed to return the latch to its inoperative position, the transmission is disabled in a position in which either the forward drive gear or the revers drive gear no longer can be engaged.

OBJECTS AND SUMMARY OF THE INVENTION

It is an object of the present invention to provide a means for preventing the inadvertent movement of the gear shift lever from the fifth speed position past the neutral position and into the reverse drive position.

It is a further object to provide such a means which is simple in construction and easy to manufacture.

It is yet a further object to provide such a means which does not rely upon or need springs biasing it to return it to its non-latching position, thereby rendering the means failsafe.

In order to accomplish the aforementioned objects, the present invention provides an automatic latch which is moved positively into a latching position at the time the gear shift lever is moved forwardly into fifth speed drive engagement, and which cannot be withdrawn from latching position until such time as the gear shift lever is moved rearwardly into neutral position and is then moved laterally towards its central position, the movement of the latch to its non-latching position occurring during the movement of the gear shift lever in said lateral direction and being effected positively without the use of biasing springs.

The present invention includes an apparatus for preventing an incorrect shifting into reverse drive gear of an automotive transmission. The transmission can include a gear shift lever and a linkage for converting movement of the lever into corresponding movements of the gear shift forks of the transmission. The shift lever is shiftable between a central neutral position and at least one selection position and between the selection position and either a forward gear position on one side of the selection position or a reverse gear position on the other side of the selection position. The apparatus comprises a projection member connected to the linkage and a latch member positioned in operative relationship with the linkage and being turnable between a locked position and an unlocked position. A lock claw is provided on the latch member positioned such that when the latch member is in the lock position, the lock claw is in a path of travel of the projection member, preventing the linkage and the shift lever from moving to the reverse gear position. Operation cam means are provided on the latch member and the projection member for turning the latch member from the unlocked position to the locked position when the shift lever is shift-operated from the selection position to the forward gear position. Release cam means are provided on the latch member and the projection member for turning the latch member from the locked position to the unlocked position when the shift lever is shift-operated from the selection position to the neutral position.

The operation cam means can comprise a projection on the latch member and a surface on the projection member adapted to engage the projection only when the shift lever is moved from the selection position to the forward gear position to turn the latch member from the unlocked position to the locked position.

The latch member can be provided with a further projection. The release cam means can comprise a first cam surface slanting outwardly on one side of the further projection and a second cam surface on the projection member facing the first cam surface when the shift lever is in the selection position.

The linkage can include at least one movable frame member. The release cam means can comprise a cam projection on the movable frame member and another projection on the latch member engageable with the cam projection only when the frame member is in a neutral position of the shift lever to turn the latch member from the locked position to the unlocked position.

The present invention can also include a reverse drive blocking latch device for an automotive transmission of the type including a gear shift lever and a linkage for converting movements of the gear shift lever into corresponding movements of gear shift forks of the transmission. The latch device comprises a latch member positioned in operative relationship with a fork shift member of the linkage. The latch member is supported for movement between two alternative positions. A projection which is carried by the fork shift member for cooperation with the latch member when the fork shift member is in a position to effect alternative engagement of a forward drive gear and a reverse drive gear of the transmission is provided, and the latch member includes a projection which is engaged by the projection on the fork shift member in movement of the fork shift member in a direction to engage the forward drive gear and which moves said latch member to one of the alternative positions. The latch member further includes a lock claw which is positioned in the path of movement of the fork shift member projection when the latch member is in the one position to restrict reverse movement of the fork shift member and inhibit engagement of the reverse drive gear. Cooperating cam surfaces of the latch member and fork shift member are provided for returning the latch plate to the other of its positions upon return of the fork shift member to an intermediate neutral position.

The cooperating cam surfaces are comprised of a ramp cam on the latch member and a cooperating ramp cam on the fork shift member, the ramp cams cooperating to move said latch member to the other position on movement of the fork shift member in one direction perpendicular to the latch member.

In a first embodiment, a further ramp cam is provided on said fork shift member which is operative to move the latch member to the other position on movement of the fork shift member in an opposite direction perpendicular to the latch member.

In a second embodiment, the cooperating cam surfaces are comprised of a ramp cam on the latch member and a cooperating ramp cam on a member associated with the fork shift member and which is angularly movable in unison therewith, the ramp cams cooperating to move the latch member to the other position on the movement of the associated member in one direction perpendicular to the latch.

The latch member can be pivotally supported for the movement between the two alternative positions. Lugs can be provided which cooperate with either a stop member or the frame to restrict the pivoting movement of the latch member.

A friction member can be interposed between the latch member and a supporting member therefor, for restraining random movement of the latch member. A spring-loaded ball latch can be provided to positively locate the latch member in either one of its two alternative positions.

BRIEF DESCRIPTION OF THE DRAWINGS

The invention will now be described with reference to the accompanying drawings, in which:

FIG. 2 is a cross-sectional view taken through a fork shift member of FIG. 1 showing the relationship of the latch member of the present invention thereto;

FIGS. 3(a), 3(b) and 3(c) are sectional underside plan views of one embodiment of the present invention taken on the line III—III of FIG. 2 showing the fork shift member and the latch member in the different positions that they occupy during a gear shifting operation;

DETAILED DESCRIPTION OF THE PREFERRED EMBODIMENTS

Figure 1:
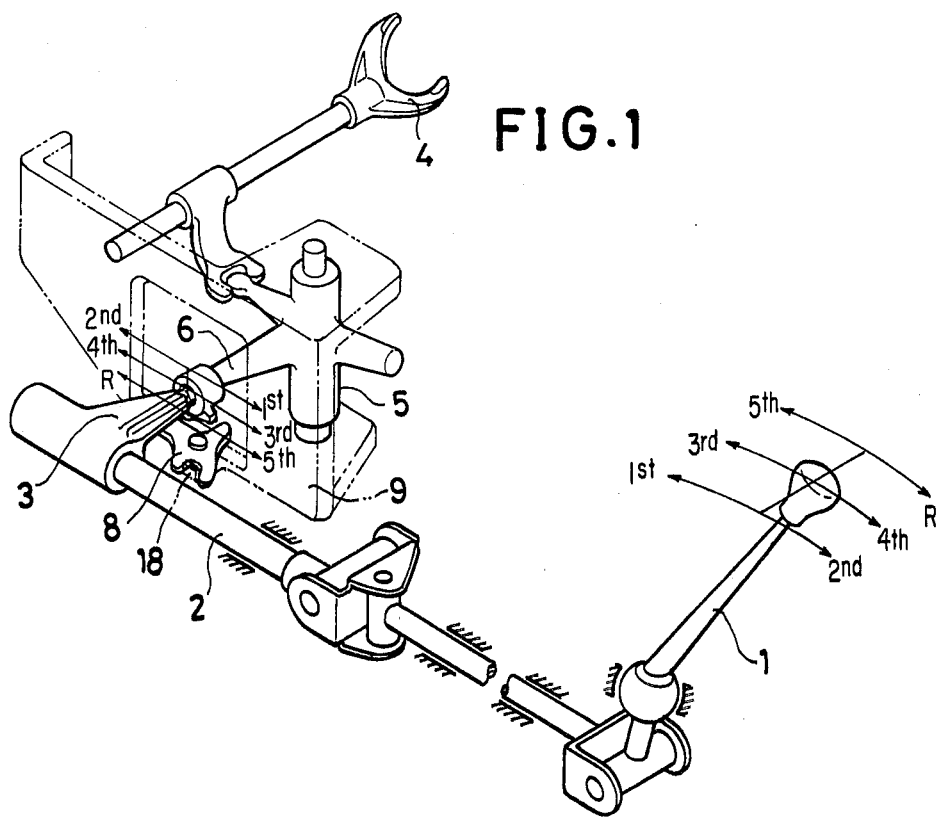
FIG. 1 is a diagrammatic illustration of a gear shift mechanism incorporating one form of automatic latch according to the present invention.

Referring now to FIG. 1, a gear shift mechanism is shown which includes a gear shift lever 1. The gear shift lever is supported for universal pivoting movement in a conventional bearing, such that the gear shift lever can be moved laterally from a central neutral position to either side thereof, and then be moved forwardly or rearwardly to effect engagement of the respective gears. The movement of the gear shift lever is restricted by a gate member in an entirely conventional manner, the gate member restricting movement of the gear shift lever to said lateral movement and said forward and rearward movements.

Connected to the lower end of the gear shift lever 1, by universal joints such as are well known in the art, is an indexing shaft 2, which is supported in bearings for rotary movement in dependence on lateral movement of the gear shift lever 1, and, for axial sliding movement in dependence on forward or rearward movement of the gear shift lever.

Rigidly secured to the indexing shaft 2 is a lateral arm 3, which is connected at its laterally extending end by means of a conventional ball joint to a lateral indexing arm 6 of a fork shift member 5.

Upon lateral shifting of the gear shift lever 1, the indexing shaft rotates, and with it the lateral arm 3, thus either raising or lowering the fork shift member 5 to bring one or more lateral arms thereof selectively into engagement with an appropriate gear shift fork 4, only one of which is illustrated in FIG. 1, specifically, the gear shift fork which effects engagement of the third speed and fourth speed drive gears.

Upon movement of the gear shift lever 1 either forwardly or rearwardly, the shaft 2 and the lateral arm 3 are moved axially, thus rotating the fork shift member 5 about its longitudinal axis in appropriate bearings provided in a frame member 9.

The structure so far described is entirely conventional, and, constitutes the starting point for the present invention.

In the absence of some form of blocking mechanism, it will be apparent that in such a known structure there exists the possibility of shifting directly from a forward drive gear, such as the fifth speed drive gear, directly into reverse drive engagement, with consequential clashing of the gears, and, possible damage thereto. Such a possibility is obviated in its entirety according to the present invention by the incorporation into the structure of a latch member 8, which now will be described with reference to FIG. 2, FIGS. 3(a), 3(b), 3(c), 4(a), 4(b), and 4(c).

As is clearly illustrated in those figures, the latch member 8 is pivotally supported in a substantially horizontal attitude on a vertical pivot 10 carried by the frame member 9. Movement of the latch member 8 about the pivot 9 is restrained by a friction washer 19 interposed between the latch member 8 and the frame member 9, the latch member 8 being forced into engagement with the friction washer 19 by a Bellville washer mounted on the vertical pivot 10. Angular movement of the latch member 8 about the vertical point 10 can be restricted by a pair of lugs 17, which respectively extend on opposite sides of a stop member 18 formed on the frame member 9. It will thus be seen that movement of the latch member 8 is restricted to move from the position shown in FIG. 3(a) to the position shown in either FIG. 3(b) or FIG. 3(c).

Integral with the latch member 8 is a projection 15, which extends into the path of movement of a projection 14 integral with the lateral indexing arm 6 at the time the fork shift member is in its lowermost position and is operative to effect engagement either of the fifth speed forward gear, or, the reverse gear. At all other times, the projection 14 being integral with the lateral indexing arm 6 is located above the plane of the projection 15 and is inoperative to effect actuation of the latch member.

In its position as shown in FIG. 3(a), rotation of the fork shift member 5 in a clockwise direction is operative to engage the reverse drive gear. This movement of the fork shift member 5 is permitted when the latch member is in the position shown in FIG. 3(a); the latch member 8 when in the position shown in FIG. 3(a); being inoperative to prevent the required clockwise movement of the fork shift member 5.

In the event that it is desired to engage the fifth speed drive gear, the fork shift member 5 is moved in a counter-clockwise direction, during which movement the projection 14 will engage the projection 15 on the latch member 8. Upon continued movement of the fork shift member in that direction, the latch member 8 will be rotated from its position as shown in FIG. 3(a) to its position shown in FIG. 3(b), in which the other of the lugs 17 is in engagement with the stop member 18.

Figure 3B:
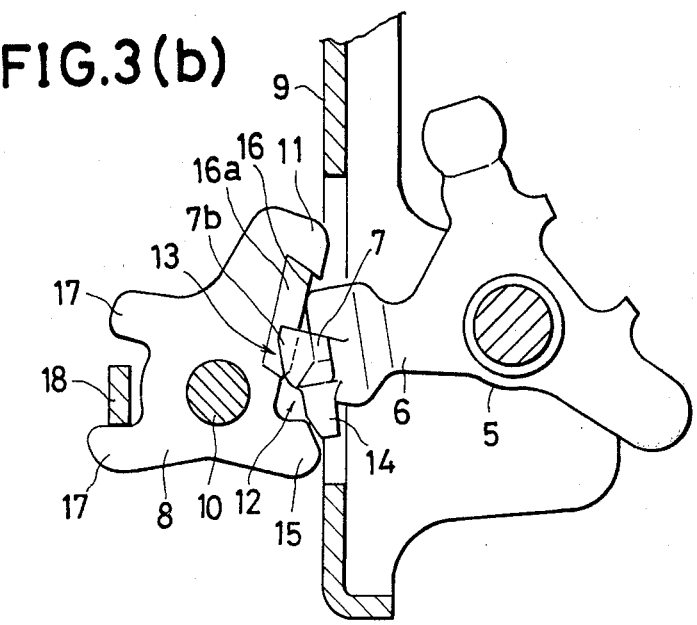
Figure 3C:
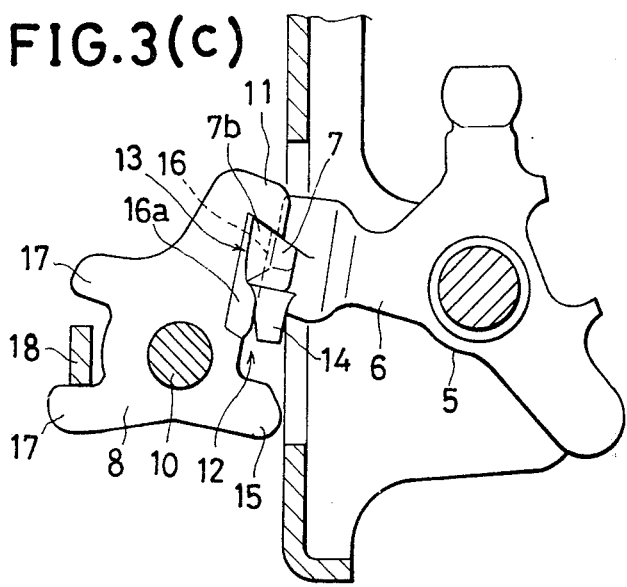

In the position of the latch member 8 as shown in FIG. 3(b), the projection 15 has been moved to a position in which it is out of the path of arcuate movement of the projection 14, thus permitting continued movement of the fork shift member 5 in a counter-clockwise direction to engage the fifth speed drive gear.

If now the operator moves the gear shift lever 1 in a reverse direction, the fork shift member 5 will rotate in a clockwise direction. Upon the gear shift lever 1 reaching the neutral position, a projection 7 integral with the lateral indexing arm 6 will engage a lock claw 11 on the latch member 8, thus prohibiting in its entirety further rotational movement of the fork shift member 5 in a clockwise direction. With the latch member 8 in the position shown in FIGS. 3(b) and 3(c), movement of the fork shift member from the forward speed gear engagement position to the reverse gear engagement position, either by carelessness or through inadvertence, is entirely prohibited; the latch member 8 prohibiting movement of the fork shift member 8 to the reverse gear position until such time as the latch member 8 is returned to the position shown in FIG. 3(a).

Figures 4A, 4B, 4C:
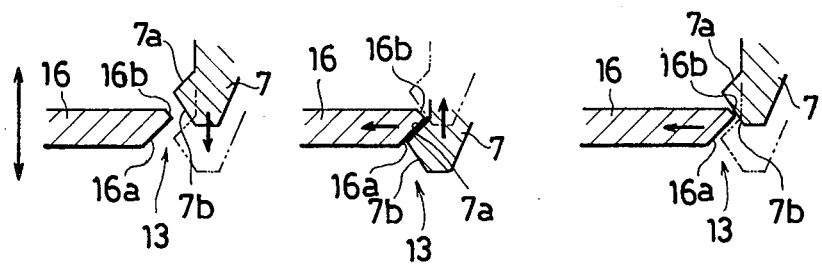
FIGS. 4(a), 4(b) and 4(c) are enlarged partial sectional views of an important section of the invention for explaining the operation thereof.

Return movement of the latch member 8 to its position shown in FIG. 3(a) is accomplished by returning the gear shift lever 1 to its central position, during which movement the fork shift member 5 is raised in position for the projection 7 to lie above the plane of the latch member 8 (FIG. 4(b)). Return movement of the latch member 8 to its position shown in FIG. 3(a) is accomplished by a ramp cam means 13 comprising ramp cam 7a comprising 7a formed on the projection 7, which cooperates with a ramp cam 16a formed on the latch member 8. As shown in FIG. 4(b) upward movement of the fork shift member 5 will cause the ramp cams 7a and 16a to ride up each other, that movement being accommodated by movement of the latch member 8 in a counter-clockwise direction to its position shown in FIG. 3(a). As previously noted above, the latch member 8, when in the position shown in FIG. 3(a) is inoperative to prevent the clockwise movement of the fork shift member 5 so as to engage reverse drive. As can be seen, the lock claw 11 is sized such that it is out of the path of arcuate movement of the projection 7.

Having returned the latch member 8 to the position shown in FIG. 3(a), the operator then has the option of engaging the reverse gear in the manner previously described.

As will be appreciated from the foregoing discussion, each movement of the latch member 8 is effected positively by the fork shift member 5 without biasing springs acting to maintain the latch member 8 in a determined position. Thus, the structure disclosed is entirely free of problems which could occur in the event of breakage of such springs.

In the event that latch member 8 is jarred out of its position shown in FIG. 3(a) by vibration during driving of the vehicle or the like while the fork shift member 5 with projection 7 is in an upper position (e.g., in the central, first speed, second speed, third speed or fourth speed drive positions), the latch member 8 on portion 16 and the projection 7 are each provided with additional ramp cams 16b, 7b respectively, opposite in slope to ramp cams 16a and 7a. As can be seen in FIG. 4(c) in this situation, downward movement of the fork shift member 5 will cause the ramp cams 7b and 16b to ride over each other, that movement being accommodated by movement of the latch member 8 in a counter-clockwise direction to return to its position shown in FIG. 3(a).

Figure 5:
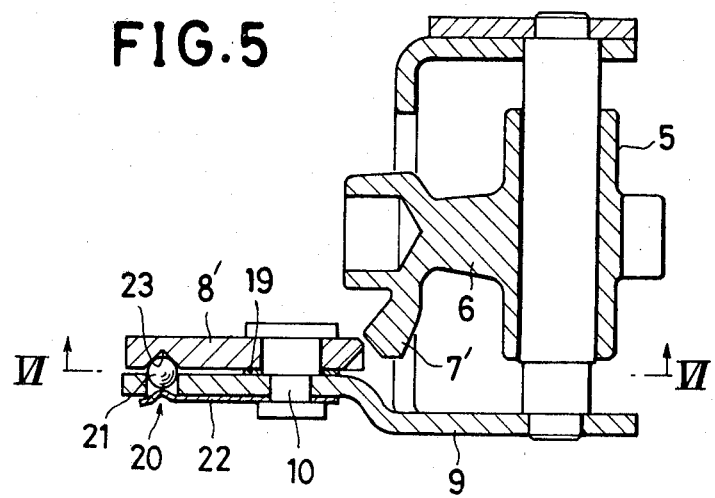
FIG. 5 is a sectional view similar to FIG. 2 showing a second embodiment of the latch of the present invention.
Figure 6:
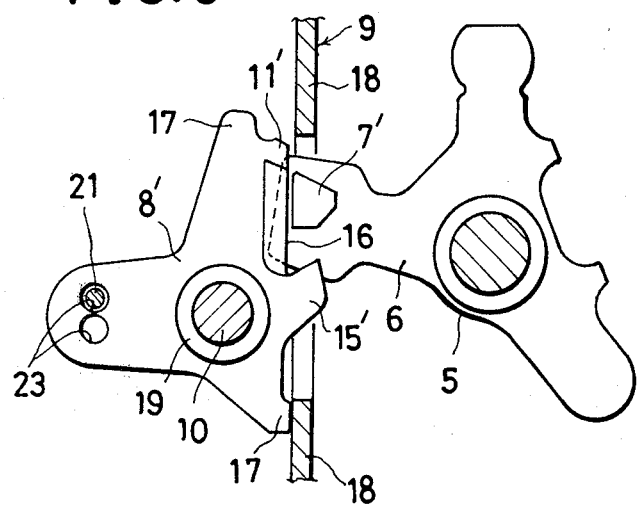
FIG. 6 is a sectional underside plan view taken on the line VI—VI of FIG. 5.

Referring now to a second embodiment shown in FIGS. 5 and 6, the fork shift member 5 includes a projection 7' which moves in the path of a projection 15' to move the latch between its two alternative positions in an identical manner to that previously described. In other words, no separate projection 14 is provided. The projection 7 is engageable with a lock claw 11' when the latch member 8' is in the other of its alternative positions. In the embodiment of FIGS. 5 and 6 the movement of the latch member 8' between its two alternative positions is limited by lugs 17 on the latch 8 which respectively engage the frame member 9 as the latch member 8' is swung from its position illustrated in FIG. 6 to its alternative position (not illustrated). To ensure that latch member 8' is jarred out of its set position, a ball latch or "click stop" 20 is provided. The ball latch includes a ball bearing 21 which is received within an aperture in the frame member 9, and which is biased by a leaf spring 22 into indentations 23, 23 formed in the latch member 8'. In this manner, positive positioning of the latch member 8' is secured.

Figure 7:
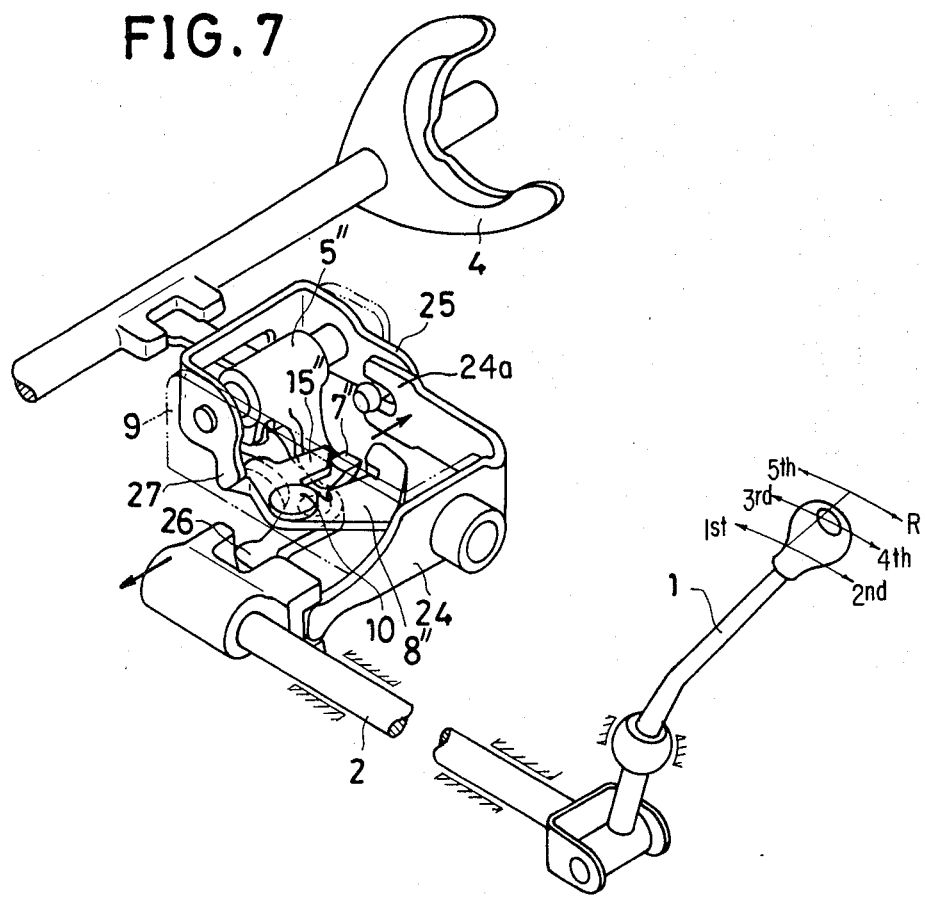
FIG. 7 is a perspective view of a third embodiment of the gear shift mechanism according to the present invention.
Figure 8A:
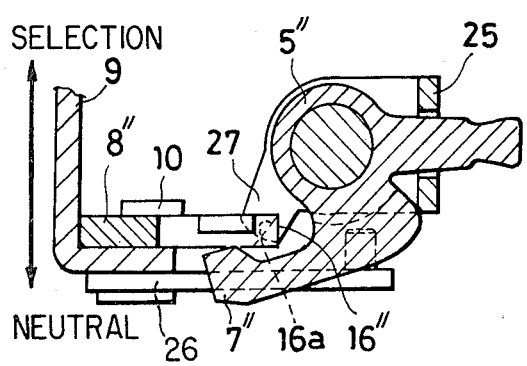
FIGS. 8(a) and 8(b) are sectional views of the embodiment of FIG. 7; illustrating the manner in which a fork shift member of the mechanism cooperates with a latch thereof; and, FIG. 9(a), FIG. 9(b), and FIG. 9(c) are fragmentary sectional plan views showing various positions of the latch member during a gear shifting operation of the embodiment of FIG. 7.
Figure 8B:
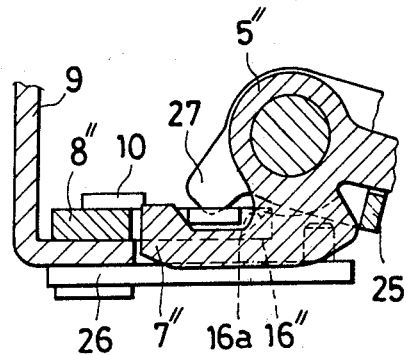
Figure 9A:
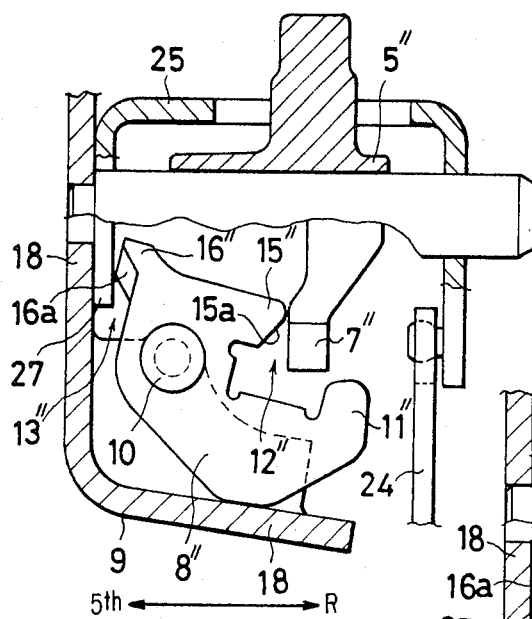
Figure 9B:
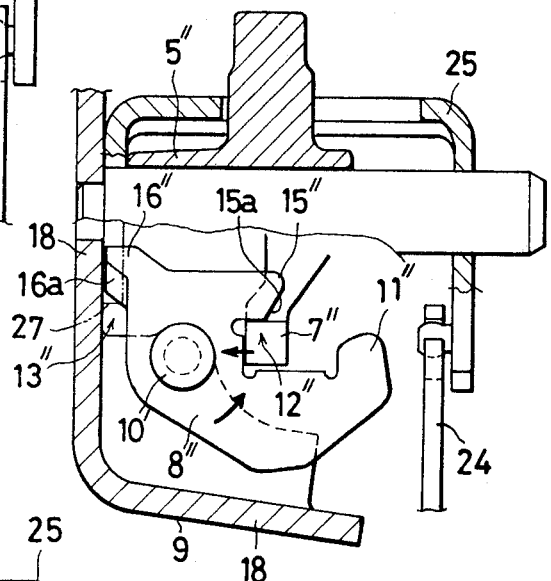
Figure 9C:
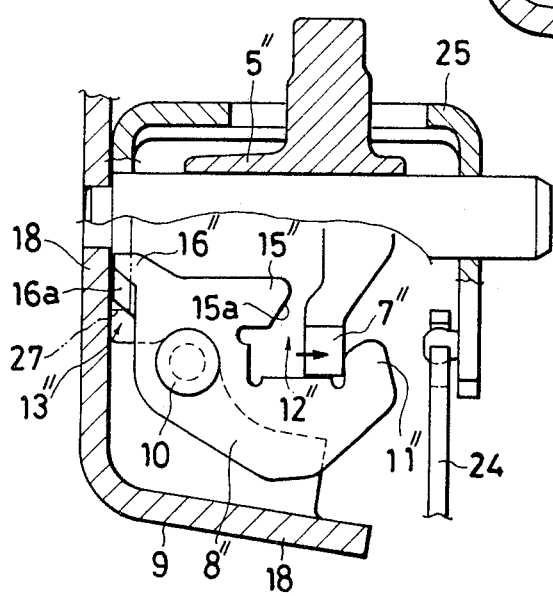

Referring now to a third embodiment shown in FIGS. 7-9, as in the embodiment of FIG. 1, the gear shift lever 1 is operatively connected to rotate the indexing shaft 2 upon lateral movement of the gear shift lever, and, to move the indexing shaft axially upon forward or rearward movement of the gear shift lever.

The indexing shaft 2 carries a block which moves in unison therewith, and which cooperates, respectively, with a first swing arm 24 and a second swing arm 26. Upon rotation of the indexing shaft 2 the first swing arm is rotated about a central pivot carried by the frame member 9 to raise or lower the opposite end 24a of the first swing arm. The opposite end 24a of the first swing arm 24 cooperates with a frame 25 which is supported in the frame member 9 for pivoting movement, raising or lowering of the opposite end 24a of the first swing arm 24 resulting in pivoting movement of the frame 25 about its horizontal pivotal axis.

Frame 25 carries the fork shift member 5. The fork shift member 5 is slidably, rotatably mounted on a shaft on the frame 25 and has a first projection 7 and a second projection extending therefrom. The second projection extends through a window in the frame 25 and engage the shift fork 4. Pivotal movement of the frame 25 raises and lowers the second projection by engagement with the edges of the window.

Upon axial movement of the indexing shaft 2, the second swing arm 26 is rotated to move the fork shift member 5 laterally, and thus move the gear fork 4 in an appropriate direction.

Upon pivoting the indexing shaft 2 in a direction for engagement of the reverse gear, the said one end of the first swing arm 24 will be moved in a counter-clockwise direction, resulting in raising of the opposite end 242 thereof and pivotal movement of the frame 25 in a counter-clockwise direction. Counter-clockwise pivoting movement of the frame 25 will result in the fork shift member 5" being rotated about its longitudinal axis to bring a projection 7" thereof into operative cooperation with a latch member 8", as is illustrated in FIGS. 8(a) and 8(b).

In that position, and as is more clearly seen in FIG. 9(a), the projection 7" lies within the jaw of the latch member 8", and is in line with a projection 15" on the latch member 8'. Movement of the fork shift member in a leftward direction to engage the fifth speed drive gear will cause the projection 7 to engage the projection 15", and then ride down a cam surface 15a thereof, swinging the latch member 8" in a counter-clockwise direction to its position as shown in FIG. 9(b).

If at this time an attempt is made by the operator to shift from the fifth speed engaged position to reverse drive, the projection 7" will engage a lock claw 11" on the latch member 8", thus prohibiting movement of the fork shift member 5" into the reverse gear engaged position.

Upon return movement of the gear shift lever 1 to a centered position, the indexing shaft 2 will rotate in an opposite direction, thus lowering the opposite end 242 of the first swing arm 24, and, causing clockwise movement of the frame 25 about its pivot. During this movement a projection 27 on the frame 25 engages a cam face 16a on the latch member 8", thus pivoting the latch member 8" to its original position as shown in FIG. 9(a).

Should the operator now desire to shift the transmission into reverse gear drive, the gear shift lever 1 is appropriately operated, movement of the fork shift member 5" in a rightward direction in FIG. 9(A) being permitted, in that the lock claw 11" is removed from the path of movement of the projection 7".

While preferred embodiments of the invention have been described, it will be appreciated that various modifications in the structures disclosed may be made within the scope of the appended claims.

What we claim is:

1. A reverse drive blocking latch device for an automotive transmission of the type including a gear shift lever and a linkage for converting movements of the gear shift lever into corresponding movements of gear shift forks of the transmission, said latch device comprising:

a latch member positioned in operative relationship with a fork shift member of said linkage, said latch member being supported for movement between two alternative positions;

a projection carried by said fork shift member for cooperation with said latch member when said fork shift member is in a position to effect alternative engagement of a forward drive gear and a reverse drive gear of the transmission;

said latch member including a projection which is engaged by said projection on said fork shift member in movement of said fork shift member in a direction to engage said forward drive gear and which moves said latch member to one of said alternative positions, said latch member further including a lock claw which is positioned in the path of movement of said fork shift member projection when said latch member is in said one position to restrict reverse movement of said fork shift member and inhibit engagement of said reverse drive gear; and cooperating cam surfaces of said latch member and fork shift member for returning said latch member to the other of its positions upon return of said fork shift member to an intermediate neutral position.

2. The reverse drive blocking latch according to claim 1 in which said cooperating cam surfaces are comprised by a ramp cam on said latch member and a cooperating ramp cam on said fork shift member, said ramp cams cooperating to move said latch member to said other position on movement of said fork shift member in one direction perpendicular to said latch member.

3. The reverse drive blocking latch according to claim 2, including a further ramp cam on said fork shift member which is operative to move said latch member to said other position on movement of the fork shift member in an opposite direction perpendicular to said latch member.

4. The reverse driving blocking latch according to claim 1 in which said cooperating cam surfaces are comprised by a ramp cam on said latch member and a cooperating ramp cam on a member associated with said fork shift member and which is angularly movable in unison therewith, said ramp cams cooperating to move said latch member to said other position on the movement of said associated member in one direction perpendicular to said latch member.

5. The reverse drive blocking latch according to claim 1, including a caming surface on said lock claw and a complimentary caming surface on said projection carried by said fork shift member, said caming surfaces cooperating to inhibit movement of said latch member from said one position upon reverse movement of said fork shift member.

6. The reverse drive blocking latch according to claim 1, in which said latch member is pivotally supported for movement between two alternative positions, and includes lugs cooperating with a stop member to restrict pivoting movement of the latch member.

7. The reverse drive blocking latch according to claim 1, in which said latch member is pivotally supported for movement between said two alternative positions, and includes lugs cooperating with a frame member to restrict pivoting movement of the latch member.

8. The reverse drive blocking latch according to claim 1, including a friction member interposed between said latch member and a supporting member therefor, for restraining random movement of the latch member.

9. The reverse drive blocking latch according to claim 1, including a spring-loaded ball latch for positively locating said latch member in either one of its two alternative positions.

10. An apparatus for preventing an incorrect shifting into reverse drive gear of an automotive transmission, the transmission including a gear shift lever and a linkage for converting movement of the lever into corresponding movements of gear shift forks of the transmission, the shift lever being shiftable between a central neutral position and at least one selection position and between the selection position and either a forward gear position on one side of the selection position or a reverse gear position on the other side of the selection position;

said apparatus comprising:

a projection member connected to said linkage;

a latch member positioned in operative relationship with said linkage and being turnable between a lock position and an unlock position;

a lock claw on said latch member positioned such that when said latch member is in said lock position, said lock claw is in a path of travel of said projection member preventing said linkage and said shift lever from moving to said reverse gear position;

operation cam means on said latch member and said projection member for turning said latch member from said unlock position to said lock position when said shift lever is shift-operated from said selection position to said forward gear position; and release cam means on said latch member and said projection member for turning said latch member from said lock position to said unlock position when said shift lever is shift-operated from said selection position to said neutral position.

11. The apparatus of claim 10 wherein said operation cam means comprises a projection on said latch member and a surface on said projection member adapted to engage said projection only when said shift lever is moved from said selection position to said forward gear position to turn said latch member from said unlock position to said lock position.

12. The apparatus of claim 11 wherein said latch member is provided with a further projection and said release cam means comprises a first cam surface slanting outwardly on one side of said further projection, and a second cam surface on said projection member facing said first cam surface when said shift lever is in said selection position.

13. The apparatus of claim 10 wherein said linkage includes at least one movable frame member, and said release cam means comprises a cam projection on said movable frame member and another projection on said latch member engageable with said cam projection only when said frame member is in a neutral position of said shift lever to turn said latch member from said lock position to said unlock position.

* * * * *